May 1, 1945.  E. H. SPIEGL  2,374,903
TRACTOR CONVEYER
Filed Jan. 31, 1942  3 Sheets-Sheet 1
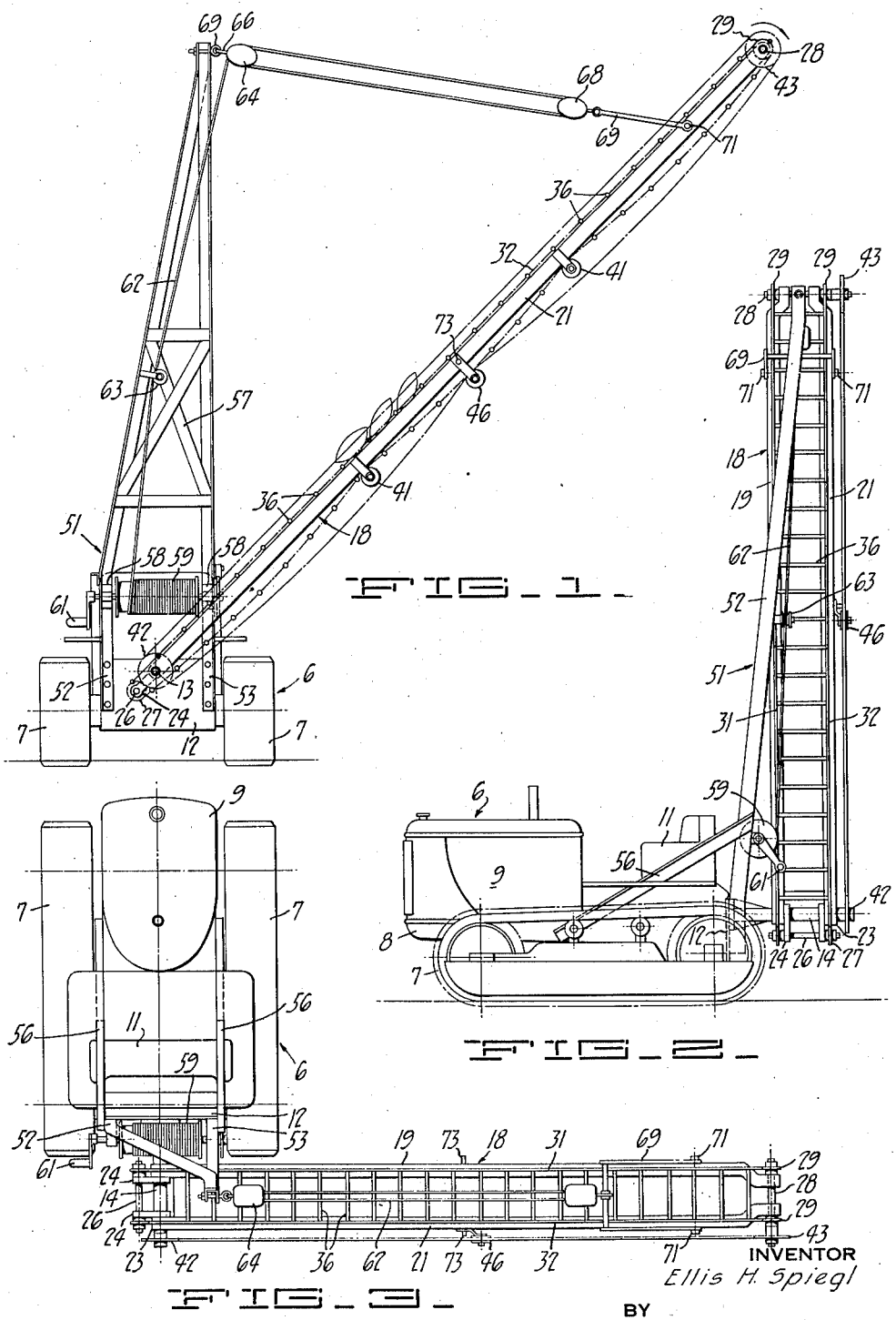
INVENTOR
Ellis H. Spiegl
BY
Marcus Lothrop
ATTY.

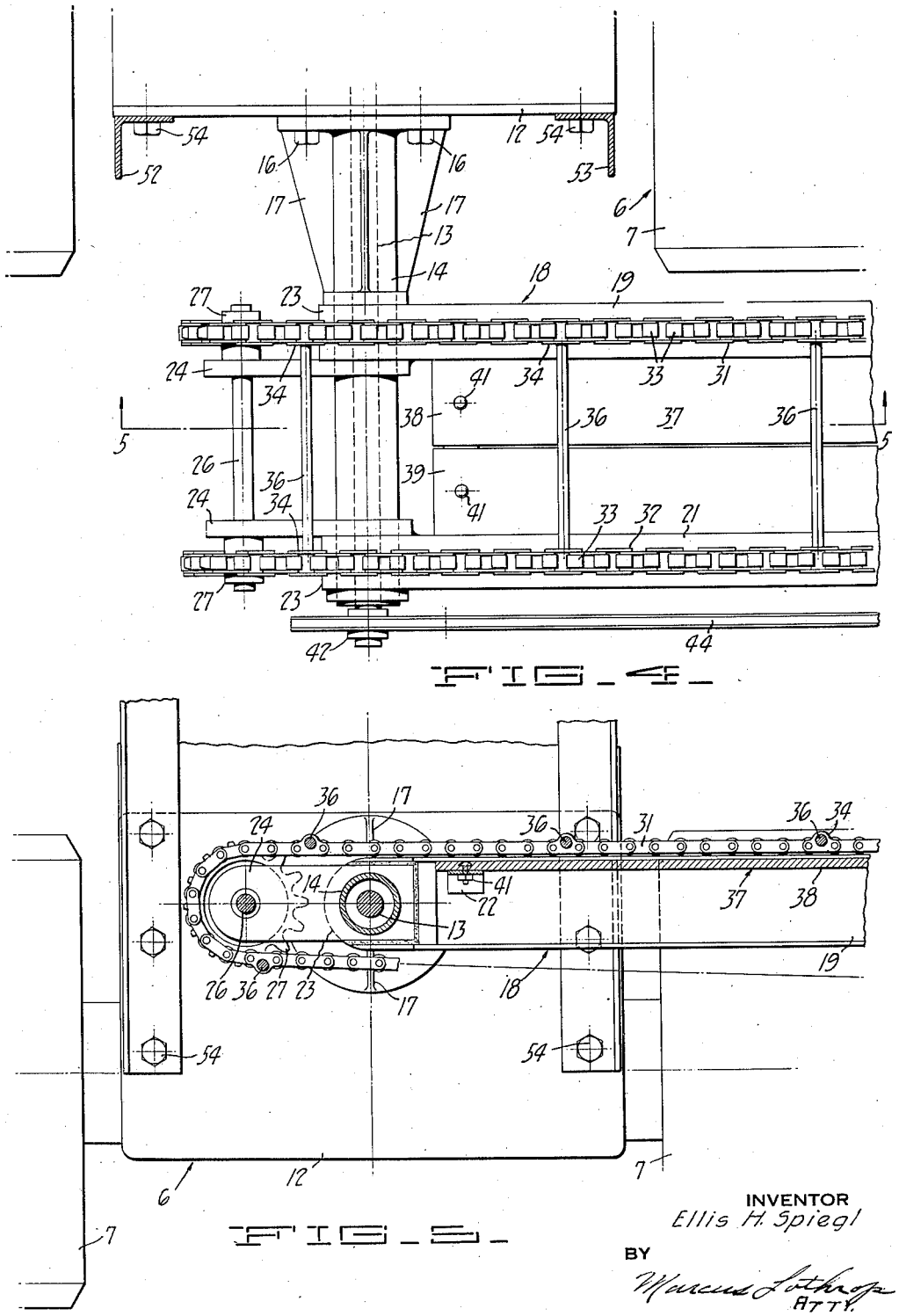

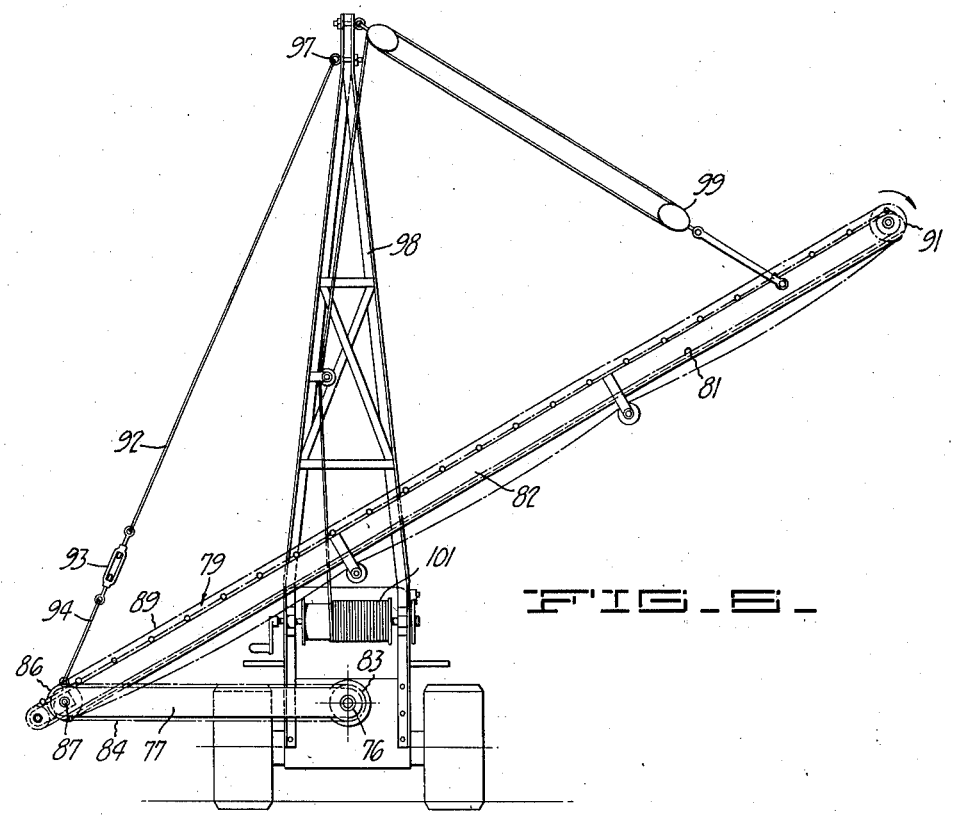
FIG_6_
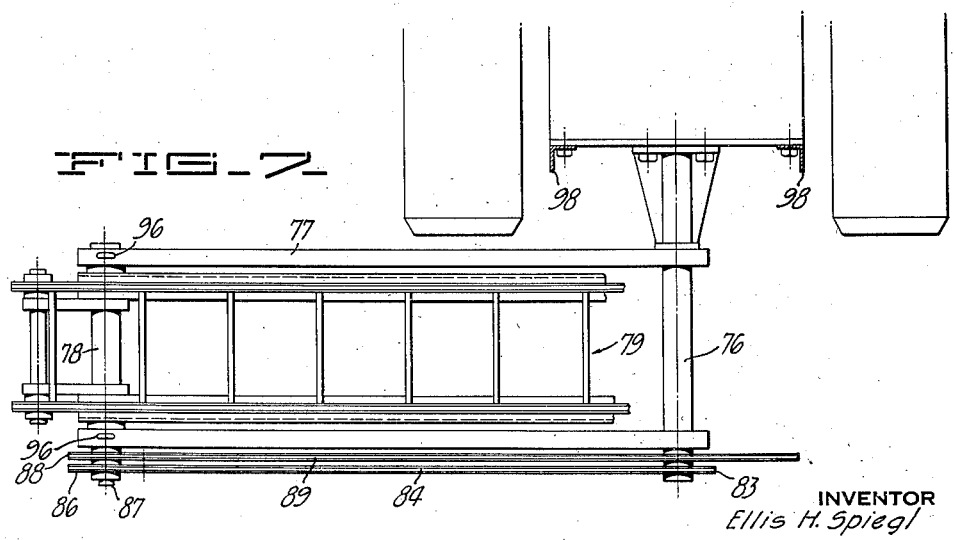
FIG_7_
INVENTOR
Ellis H. Spiegl
BY
Marcus Lothrop
ATTY.

Patented May 1, 1945

2,374,903

UNITED STATES PATENT OFFICE 2,374,903

TRACTOR CONVEYER

Ellis H. Spiegl, Salinas, Calif.

Application January 31, 1942, Serial No. 429,064

7 Claims. (Cl. 198—233)

My invention relates to a portable or mobile means for elevating articles or packages to any selected or desired height within limits of the structure, and is particularly concerned with a portable mechanism for assisting in placing sand bags or comparable packages in position, for example: in quickly erecting revetments or making comparable deposits of material. It is customary in making revetments to place sacks of sand in the desired pattern on the ground, and to continue to pile successive sacks of sand upon those previously deposited, until there is erected a wall or embankment of any desired height, for example, fifteen or twenty feet. Often while one of the sides of such wall is substantially vertical, the other side is at an inclination.

It is an object of my invention to provide a machine which can be transported to the desired location of a revetment, and will then assist in positioning the sand sacks beginning at a point close to the ground and continuing until the maximum height is reached.

Furthermore, it is an object of my invention to provide a tractor conveyer which can be swung about in different locations in order to facilitate the disposition of the material being conveyed.

Another object of my invention is to supply a tractor conveyer which can readily be detached for highway transport.

A further object of my invention is to provide a tractor conveyer which is easily fabricated of substantially standard materials.

An additional object of my invention is to provide a tractor conveyer which can readily be attached to a tractor of standard manufacture.

Other objects, together with the foregoing, will be set forth in the following specification and are illustrated in the accompanying drawings, in which Fig. 1 is a rear elevation of a tractor showing the tractor conveyer of my invention applied thereto in working position.

Fig. 2 is a side elevation of the structure shown in Fig. 1.

Fig. 3 is a plan of the structure shown in Fig. 1.

Fig. 4 is an enlarged plan of the rearward portion of the tractor and the rear portion of the conveyer, showing the details of construction.

Fig. 5 is a cross-section, the plane of which is indicated by the line 5—5 of Fig. 4.

Fig. 6 is a rear elevation of a modified form of my invention.

Fig. 7 is a partial plan of the Fig. 6 structure.

In its preferred form, the tractor conveyer of my invention is intended to be applied to a standard tractor which has a rear gear housing with a power take-off shaft projecting rearwardly therefrom, and includes a sleeve or quill on the gear housing, preferably encompassing the power take-off shaft, and on which a conveyer frame is mounted. The conveyer frame is likewise supported by a tackle arrangement connected to a superstructure mounted on the rear gear housing, while on the conveyer frame is a chain conveyer having flights thereon at convenient intervals, the chain conveyer being advanced by a drive chain engaging a sprocket on one of the conveyer shafts, and likewise being driven from the power take-off shaft.

While the tractor conveyer of my invention can be applied to various different sorts of tractors, it has successfully been embodied in connection with a tractor of the type shown herein, which includes a vehicle 6 supported on track-laying tracks 7, and incorporating a central main frame 8 between the tracks on which an engine compartment 9 is disposed, and on which an operator's station 11 is located. Beneath the operator's station and forming a part of the main frame 8 is a rear gear housing 12, which customarily encloses the final drive gears of the tractor and affords on its rear face a suitable mounting for implements and auxiliary mechanisms. The rear gear housing has projecting therefrom or is provided with a power take-off shaft 13, the axis of which is parallel to the longitudinal axis of the tractor 6 and which extends rearwardly substantially halfway between the tracks 7.

In accordance with the form of my invention shown in Figs. 1 to 5, I preferably mount on the rear gear housing 12 a sleeve 14 or quill (Fig. 4) which is secured in place by a plurality of removable fastening studs or bolts 16. The sleeve or quill 14 is preferably adequately reinforced by ribs 17 to transmit a considerable load to the rear gear housing 12. In effect, therefore, the quill 14 becomes a detachable part of the tractor main frame 8.

While various locations for the quill 14 on the gear housing are possible, I preferably mount it so that the axis of the quill is concentric with the axis of the power take-off shaft 13 which passes entirely through the quill 14, preferably also being journalled therein.

Mounted on the quill 14 for swinging movement is a conveyer or belt frame, generally designated 18. This frame preferably incorporates a pair of side channels 19 and 21 respectively, which are substantially parallel and which are connected at intervals by cross straps 22. At their lower ends the channels 19 and 21 are provided with bearings 23 mounted on the quill 14 for rotation or swinging movement thereon. Adjacent to the bearings 23 there are provided extensions 24 closer together than the space between the channels 19 and 21 and which themselves serve as bearings for a lower conveyer shaft 26. This shaft is parallel with the power take-off shaft 13 and at its opposite ends is provided with chain sprockets 27. Similarly, journalled in the upper end, the belt frame 18 is provided with an upper conveyer shaft 28 which serves as a mounting for upper sprockets 29 in alignment with the sprockets 27.

Engaging the pairs of sprockets 27 and 29 are conveyer chains 31 and 32, which are identical, and preferably are not only supported by engagement with the sprockets but likewise carry rollers 33 so that the chains are supported and move on the upper flanges of the channels 19 and 21 with a minimum of friction.

At suitable intervals throughout their entire compass, the chains are provided with special links 34 to which are secured transverse flights 36, preferably constituted by pipe raised slightly above the surface of the channels 19 and 21 and likewise spaced slightly above the surface of a panel 37, constituted by a pair of planks 38 and 39 which are secured between the channels 19 and 21 by fastenings 41, securing them to the straps 22.

While the upper run of the conveyer remains by gravity in close relationship with the conveyer frame, the lower run is inclined to sag unduly, and to hold it within a reasonable location I provide a number of idler wheels 41 depending from the conveyer frame 18 and forming supports for the lower run.

In order appropriately to drive the conveyer belt (comprised of the chains 31 and 32 as well as the flights 36), I preferably mount on the end of the power take-off shaft 17 a drive sprocket 42, and in alignment therewith mount a driven sprocket 43 on the end of the upper conveyer shaft 28. Trained around the two sprockets 42 and 43 is a drive chain 44 extending from the lower portion to the upper portion of the conveyer, and intermediate its ends sustained by an idler sprocket 46 depending from the conveyer frame 18. In this fashion when the power take-off shaft 17 is energized, driving force is transmitted to the upper conveyer shaft 28 so that the upper run of the conveyer is placed under tension and the flights 36 are advanced upwardly over the conveyer frame so that materials which are deposited adjacent to the lower part of the frame such as sacks of sand, are engaged by and rest upon the successive flights (as shown in Fig. 1) and are conveyed upwardly to the upper end of the conveyer over which they are discharged.

In order that the conveyer frame 18 may be disposed at any desired elevation at its outer or upper end, I provide an appropriate supporting mechanism. Preferably fastened to the rear of the gear housing 12 is a superstructure, generally designated 51, which preferably includes a pair of uprights 52 and 53, each of which is secured by removable fastenings such as studs or bolts 54 to the gear housing. The superstructure extends upwardly to an apex and is provided with readily removable braces 56 extending from the uprights 52 and 53 forwardly to engage the main frame 8 of the tractor. The uprights are inclined rearwardly so that at their upper end where they are joined together, they overlie approximately the center of the conveyer frame 18. At an appropriate height the uprights are fastened together by suitable bracing 57.

At a convenient height in their lower portion, the uprights 52 and 53 are provided with journals 58 in which a winch drum 59 is rotatably mounted. A hand crank 61 serves to operate the winch drum, which can also be provided with the customary braking or ratchet devices. From the winch drum 59 an operating cable 62 extends over a guide pulley 63 on the superstructure 51 and then engages one of the blocks 64 of the block and tackle mechanism. The block 64 is fastened by a hook 66 to an eye 67 engaging the apex or upper joined ends of the uprights 52 and 53. The cable 62, after having engaged the block 64 then engages the other block 68 of the block and tackle mechanism and finally is appropriately dead-ended. The block 68 is connected to a bail 69 which is arched over the conveyer and engages suitable pivot pins 71 located on opposite sides of the conveyer frame 18, preferably near the outer end thereof. With this arrangement and upon manipulation of the winch 59, the conveyer frame can be raised and lowered, that is, swung about the quill 14 as an axis and can be raised from a position very close to the ground up into a position of maximum elevation which can be fifteen or twenty feet from the ground. With this arrangement, when the conveyer is lowered the sand bags can be placed on the tractor end of the conveyer and can be advanced to the position for deposit. As the wall is increased in height, successive manipulations of the winch 59 can be utilized to lift the outer end of the conveyer frame so that the sand bags are delivered to higher and higher elevations.

When it is necessary to deliver the bags to different locations rather than in one spot, it is very easy for the operator to manipulate the tractor 6 to swing the conveyer through an arc or otherwise to a different position for deposit of the sand bags.

When the mechanism is to be transported from one location over a highway or other terrain where mechanisms of great height cannot be moved, it is very simple to dismantle the conveyer structure. I provide on the conveyer frame 18 near the center of gravity, a pair of pins 73 which can be engaged by the bail 69. That is, for transport the conveyer frame can be lowered to rest upon the ground or some suitable supporting object, the bail 69 can then be readily disengaged from the pins 71 and re-engaged with the pins 73. Then upon loosening and removal of the studs 16, the quill 14 and power take-off shaft 17 can be withdrawn rearwardly from the tractor. Since the conveyer frame is then suspended by the superstructure substantially at the center of gravity of the conveyer, it is an easy matter to manipulate the detached conveyer into position for hauling on a truck or other suitable vehicle. After detachment of the bail 69, for example, by removing the block 68 therefrom, the superstructure can be removed from the tractor by detaching the braces 56 and by removing the fastenings 54, whereupon the entire superstructure can likewise be loaded onto a transport truck. In this fashion, simply by removing a dozen or so studs, the entire superstructure and conveyer mechanism can be detached from the tractor and equally can be easily reassembled thereon at a new location.

Somewhat better balance and additional room for workmen in charging the conveyer are provided in the variant form of my invention disclosed in Figs. 6 and 7. This form in most respects is substantially the same as the form just described but departs from it in the mounting and in the suspension arrangement particularly. Mounted on the quill 76 is a part of the general conveyer frame which may be referred to as a sub-frame or mounting frame 77. The frame 77 is generally included in the designation conveyer frame where used in the claims since it forms part of the mounting and supporting structure for the conveyer. The frame 77 is comprised of a pair of members journalled on the quill 76 and extending to support a secondary quill 78. Mounted on the secondary quill 78 is a conveyer structure, generally designated 79, which for the most part is identical with the one previously described and as shown, for example, in Fig. 1. Substantially the only difference in this conveyer mechanism is that the return run 81 of the conveyer chain is held or supported by the lower flange of the side channel 82 rather than by rollers such as 41. Otherwise the mechanism is identical. Substantially as in the previous mechanism, the power take-off shaft terminates in a sprocket 83 which is engaged by a power transmitting chain 84 extending around a sprocket 86 on a lay shaft 87 journalled in the secondary quill 78. Also mounted on the lay shaft 87 is a sprocket 88 to which a drive chain 89 is related. The drive chain extends around an upper driving sprocket 91, in all respects identical with the sprocket 43 so that the drive is similarly transmitted from the power take-off shaft to the conveyer.

In addition to its journalled support on the quill 76, the extension frame 77 is likewise held in position by a guy wire 92 having a length adjuster 93 therein which at its lower end is connected to a bail 94 secured to eyes 96 on the frame 77 and at its upper end secured to an eye 97 mounted in a superstructure 98 which is identical with the superstructure previously described in general construction. By suitably establishing the length of the guy wire 92, the lower end of the conveyer 79 is set at any desired height and since the conveyer frame 77 always rotates about the axis of the quill 76, the length of the driving chain 84 remains constant. The outer end of the conveyer 79 is adjusted as in the previous embodiment, that is, by a block and tackle arrangement 99 controlled through a winch 101. Thus, the outer end of the conveyer can be swung in an arc about the axis of the secondary quill 78 as a center so that the length of the drive chain 89 remains constant in any adjusted position of the parts.

In this form of the invention, while the same general characteristics are present, still the weight of the conveyer is more evenly disposed on the tractor and the loading or lower end of the conveyer is more readily accessible to a crew of workmen placing sandbags on the conveyer chain. The same considerations as to portability and the like apply, however, to this arrangement so that in either form of my invention an improved tractor conveyer is provided.

I claim:

1. A tractor conveyer for use with a tractor having a gear housing and a power take-off shaft projecting from said housing comprising: a quill secured to said housing and surrounding said shaft; a conveyer frame journalled on said quill; a conveyer shaft on said conveyer frame adjacent the discharge end thereof; a conveyer on said frame engaging said shaft; a drive connection between said power take-off shaft and said conveyer shaft; a superstructure mounted on said tractor; and means for supporting said conveyer frame from said superstructure.

2. A tractor conveyer for use with a tractor having a rear gear housing and a power take-off shaft projecting rearwardly from said housing comprising a supporting sleeve secured to said housing with the axis of said sleeve disposed parallel to the axis of said shaft, a conveyer frame journalled on said sleeve, a conveyer on said conveyer frame, a drive connection between said conveyer and said power take-off shaft, a superstructure mounted on said gear housing and extending part way over said conveyer frame, and means extending between said superstructure and said conveyer frame for swinging said conveyer frame about said supporting sleeve.

3. A tractor conveyer for use with a tractor having a main frame including a rear gear housing and a power take-off shaft projecting rearwardly from said housing comprising: a quill adapted to be secured to said housing over said power take-off shaft; a conveyer frame including a sub-frame journalled on said quill and a belt frame articulated to said sub-frame; a superstructure on said tractor; means for supporting said conveyer frame including said sub-frame and said belt frame from said superstructure; a conveyer on said belt frame; and means for connecting said conveyer and said power take-off shaft for advancing said conveyer.

4. A tractor conveyer for use with a tractor having a main frame including a rear gear housing and a power take-off shaft projecting rearwardly from said housing comprising: a quill adapted to be secured to said housing over said power take-off shaft; a sub-frame journalled on said quill; a secondary quill on said sub-frame; a superstructure on said tractor; means for supporting said sub-frame from said superstructure; a belt frame journalled on said secondary quill; means for supporting said belt frame from said superstructure; a conveyer on said belt frame; and means for connecting said conveyer to said power take-off shaft.

5. A tractor conveyer for use with a tractor having a gear housing and a power take-off shaft projecting from said housing comprising a superstructure on said housing, a conveyer, means for supporting one end of said conveyer from said superstructure, means for supporting the other end of said conveyer at least in part from said housing, said supporting means affording swinging movement of said conveyer, and means for connecting said conveyer to be driven by said drive shaft despite swinging movement of said conveyer.

6. A tractor conveyer for use with a tractor having a power take-off shaft projecting from the rear thereof, a quill secured to the tractor body and surrounding said take-off shaft, a sub-frame journalled at one end on said quill and extending laterally beyond the side of the tractor, means carried by the tractor for supporting the other end of said sub-frame, a conveyer frame journalled at one end on the said other end of the sub-frame, means carried by the tractor for adjustably supporting the remote end of said conveyer frame, a conveyer on said conveyer frame and means connecting the power take-off shaft to the conveyer.

7. A tractor conveyer for use with a tractor having a power take-off shaft projecting from the rear thereof, a quill secured to the tractor body and surrounding said power take-off shaft, a sub-frame journalled at one end on said quill and extending laterally beyond the side of the tractor, means carried by the tractor for supporting the outer end of said sub-frame, a conveyer frame journalled at one end on said outer end of the sub-frame and extending over said sub-frame to a point beyond the opposite side of the tractor, means for adjustably supporting the outer end of the conveyer frame, a conveyer on said conveyer frame and means connecting the power take-off shaft to the conveyer.

ELLIS H. SPIEGL.